United States Patent
Maurer

(10) Patent No.: US 8,869,642 B2
(45) Date of Patent: Oct. 28, 2014

(54) METHOD FOR ENGAGING AT LEAST ONE SPEED-INCREASING OR SPEED REDUCTION STAGE IN A TRANSFER BOX

(75) Inventor: Markus Maurer, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 190 days.

(21) Appl. No.: 13/704,286

(22) PCT Filed: May 4, 2011

(86) PCT No.: PCT/EP2011/057112
§ 371 (c)(1),
(2), (4) Date: Dec. 14, 2012

(87) PCT Pub. No.: WO2011/157477
PCT Pub. Date: Dec. 22, 2011

(65) Prior Publication Data
US 2013/0087018 A1    Apr. 11, 2013

(30) Foreign Application Priority Data
Jun. 17, 2010 (DE) .......................... 10 2010 030 242

(51) Int. Cl.
| | |
|---|---|
| *F16H 59/00* | (2006.01) |
| *F16H 61/04* | (2006.01) |
| *F16H 61/70* | (2006.01) |
| *F16H 37/04* | (2006.01) |
| *F16H 61/08* | (2006.01) |

(52) U.S. Cl.
CPC .......... *F16H 37/042* (2013.01); *F16H 61/0403* (2013.01); *F16H 61/70* (2013.01); *F16H 2306/48* (2013.01); *F16H 2061/085* (2013.01)
USPC .............................................. 74/335; 74/745

(58) Field of Classification Search
USPC .................................................... 74/335, 745
See application file for complete search history.

(56) References Cited

U.S. PATENT DOCUMENTS

| | | | |
|---|---|---|---|
| 5,411,450 A | 5/1995 | Gratton et al. | |
| 6,520,040 B2 * | 2/2003 | Cox | ............................ 74/336 R |

(Continued)

FOREIGN PATENT DOCUMENTS

| | | |
|---|---|---|
| DE | 102 38 128 A1 | 3/2004 |
| DE | 10 2006 050 323 A1 | 10/2007 |

(Continued)

OTHER PUBLICATIONS

German Search Report Corresponding to DE 10 2010 0360 242.2, Jun. 17, 2010.
International Search Report Corresponding to PCT/EP2011/057112, Apr. 5, 2011.
Written Opinion Corresponding to PCT/EP2011/057112, Apr. 5, 2011.

*Primary Examiner* — Ha D Ho
(74) *Attorney, Agent, or Firm* — Davis & Bujold, PLLC; Michael J. Bujold

(57) ABSTRACT

A method of shifting at least one of a speed increasing stage (H) and/or a speed reductions stage (L) in a claw shifted transfer gear box (VG) in a drive train of a vehicle having a drive engine and a load shiftable shift transmission (SG). The transfer gearbox (VG) is shifted into the neutral position (N) and, after the synchronization, is shifted into the speed increasing stage (H) or the speed reductions stage (L). During synchronization, the shift transmission (SG) is decelerated or accelerated, by activating at least an additional shift element, so that the output rotational speed (n_SG) of the shift transmission (SG) is matched to the output rotational speed (n_VG) of the transfer gearbox (VG), multiplied by the target gear ratio in the transfer gear box (VG).

6 Claims, 3 Drawing Sheets

(56) References Cited

U.S. PATENT DOCUMENTS

| | | |
|---|---|---|
| 7,288,040 B2 | 10/2007 | Baasch et al. |
| 7,442,148 B2 | 10/2008 | Eckle et al. |
| 7,473,203 B2 | 1/2009 | Ogata |
| 7,949,452 B2 * | 5/2011 | Eriksson et al. .............. 701/55 |
| 8,225,695 B2 * | 7/2012 | Hayes ........................... 74/745 |
| 8,726,749 B2 * | 5/2014 | Hirsch et al. .................. 74/335 |
| 8,789,433 B2 * | 7/2014 | Jerwick et al. ................ 74/329 |
| 2009/0281697 A1 | 11/2009 | Shultz et al. |

FOREIGN PATENT DOCUMENTS

| | | |
|---|---|---|
| DE | 10 2007 010 829 A1 | 9/2008 |
| WO | 2004/109161 A1 | 12/2004 |
| WO | 2008/107318 A1 | 9/2008 |
| WO | 2010/006872 A1 | 1/2010 |

* cited by examiner

METHOD FOR ENGAGING AT LEAST ONE SPEED-INCREASING OR SPEED REDUCTION STAGE IN A TRANSFER BOX

This application is a National Stage completion of PCT/EP2011/057112 filed May 4, 2011, which claims priority from German patent application serial no. 10 2010 030 242.2 filed Jun. 17, 2010.

FIELD OF THE INVENTION

The present invention concerns a method for engaging at least one speed increasing stage and/or speed decreasing stage in a claw-shifted transfer transmission box in a drive train of a vehicle.

BACKGROUND OF THE INVENTION

It is known in the automotive technology that, for the increase of the ratio spread in a shift transmission, a non-synchronized transfer gear box is connected downstream. The transfer gear box can be, for instance, designed in two steps with a speed increase step as a road gear and a speed reduction step as an off road gear.

For instance, known through the publication WO 2010/006872 A1 is a method to control a drive train of a vehicle with a drive motor and a main transmission, and with a transfer gear box, through which shifting is automatically executed in the transfer gear box during the drive. Hereby, the drive train is separated from the powershift transmission, the transfer gear box is shifted and a suitable gear will be engaged again in the powershift transmission. This situation necessarily causes an interrupt of the traction force because for shifting to the speed increasing step or to the speed reduction step in the transfer gear box, it necessarily requires an interrupt of the traction force.

SUMMARY OF THE INVENTION

The present invention has the task to propose a method of the above described genus in which the time of the traction force interrupt is reduced to a minimum.

Thus, a method is proposed for engaging at least one speed increasing stage and/or speed reduction stage for a claw shifted transfer gear box in a drive train of a vehicle having a drive engine and a powershift transmission, in particular an automatic transmission, whereby the transfer gearbox is shifted into the neutral position or rather into neutral, and, after synchronization, the speed increasing stage or the speed reduction stage is shifted within the transfer gearbox. In accordance with the invention and during synchronization, the transfer gearbox is temporarily interlocked through activation of at least an additional shift element, so that the output rotational speed of the shift transmission is matched as fast as possible with the output rotational speed of the transfer gearbox, multiplied with the target gear ratio in the transfer gearbox.

Thereby and during the shifting of the transfer claw gearbox, as a matter of principle, the resulting traction force interruption is reduced to a minimum by means of the powershift transmission whereby, through a controlled braking or acceleration of the drive train in the powershift transmission, the output of the shift transmission is brought to a synchronized rotational speed of the transfer gearbox in the new gear step, either through the deceleration or acceleration, respectively, depending whether an upshift or a downshift is present. As an advantage, the inventive method creates a reduction of the traction force interrupt during an upshift without the intervention of an engine brake and during downshifting without a pre-definition of a rotational speed of the engine.

Within the framework of an especially advantageous embodiment variation of the invention, a method is provided such that for the braking or acceleration of the shift transmission, an additional shift element is activated to enable synchronization of a higher or lower gear in the shift transmission, until the desired synchronization rotational speed has been reached. The selection of the shift element which has to be synchronized is hereby dependent on the gear step to be shifted or the gear ratio, respectively.

As an example, the transfer gearbox can be shifted during an upshift by the speed reduction step to neutral and thereafter, a shift element of a lower gear of the shift transmission can be activated in a way such that the output rotational speed of the shift transmission can be reduced through controlled interconnecting, until the output rotational speed of the shift transmission and the output rotational speed of the transfer gearbox, multiplied with the target gear ratio, are synchronized in the transfer gearbox, so that the transfer gearbox can be shifted from neutral into the desired gear step.

Within the framework of the upshift, an overall gear ratio change can take place in the drive train, for example, from the fifth gear step to the sixth gear step, wherein in the shift transmission the originally selected gear is preferably reduced by one or several gear steps, and is shifted in the transfer gearbox from the speed reduction stage or low, respectively, to the speed increasing stage or high, respectively. It is, however, possible that for instance in the shift transmission several gear step stages during the shift operation are executed in the transfer gearbox to also accomplish other gear ratios.

Within the framework of this inventive method and during a downshift in the gear train, the speed increasing stage high shifts to neutral and thereafter, a shift element of a higher gear of the shift transmission is activated for the acceleration of the output rotational speed of the shift transmission until the output rotational speed of the shift transmission is synchronized with the output rotational speed of the transfer gearbox, so that the transfer gearbox can be shifted from the neutral position to the speed reductions stage low.

Within the framework of the downshift, a complete gear ratio change can take place in the drive train, for instance, from the sixth gear step in to the fifth gear step, wherein in the shift transmission the originally selected gear is increased by one or several gear steps, and a shifting takes place in the transfer gearbox from the speed increasing stage or high, respectively, to the speed reduction stage or low, respectively. It is, however, possible that for instance during the shift operation in the shift transmission, several gear step stages are executed in the transfer gearbox to also accomplish other gear ratios.

Independent of the nature of the shift operation which needs to be executed, it can be provided within the framework of the proposed method that, for the disengagement of the drive engine during the synchronization, the activation pressure of the torque converter lockup clutch is reduced prior to shifting the transfer gearbox to neutral to disengage the torque converter lockup clutch and after shifting the speed increasing stage or the speed reductions stage in the transfer gearbox, the activation pressure of the torque converter lockup clutch is again increased to engage the torque converter lockup clutch.

In this manner, the output of the shift transmission can just be decelerated or accelerated through the interconnecting of the drive train, because the drive engine gets decoupled from the following drive train through the disengagement of the torque converter lockup clutch. Thus, the shift transmission is only coupled hydraulically, on the thrust side, via the torque converter lockup clutch with the engine. Therefore, the shift elements only need to decelerate the moment of inertia of the shift transmission, the secondary side of the torque converters and the output shaft up to the shift claw of the transfer gearbox. The mass of the engine does not need to be decelerated in this case because it is decoupled from the shift transmission disengagement of the torque converter lockup clutch.

If interconnecting the drive train within the framework of the inventive method takes place with the drive engine not disengaged, there is a difference that the torque converter lockup clutch is not disengaged or immediately again engaged after the transfer gearbox has reached the neutral position. In that condition, the shift elements of the power-shift transmission decelerate the moments of inertia of the drive engine, as well as the moments of inertia of the shift transmission. When the synchronous rotational speed is reached, the torque converter lockup clutch is briefly disengaged and the activating pressure of the respective shift elements is reduced so as to then shift the transfer gearbox from the neutral position into the desired gear ratio and to engage the respective shift elements in the shift transmission such that the engine torque can again be transferred. This configuration has the advantage that a larger activation pressure is needed to activate the shift elements which allows better control through the shift transmission in regard to the acceleration or deceleration operation, respectively.

BRIEF DESCRIPTION OF THE DRAWINGS

In the following, the present invention is further explained based on the drawings. These show.

DETAILED DESCRIPTION OF THE PREFERRED EMBODIMENTS

Figure 1:
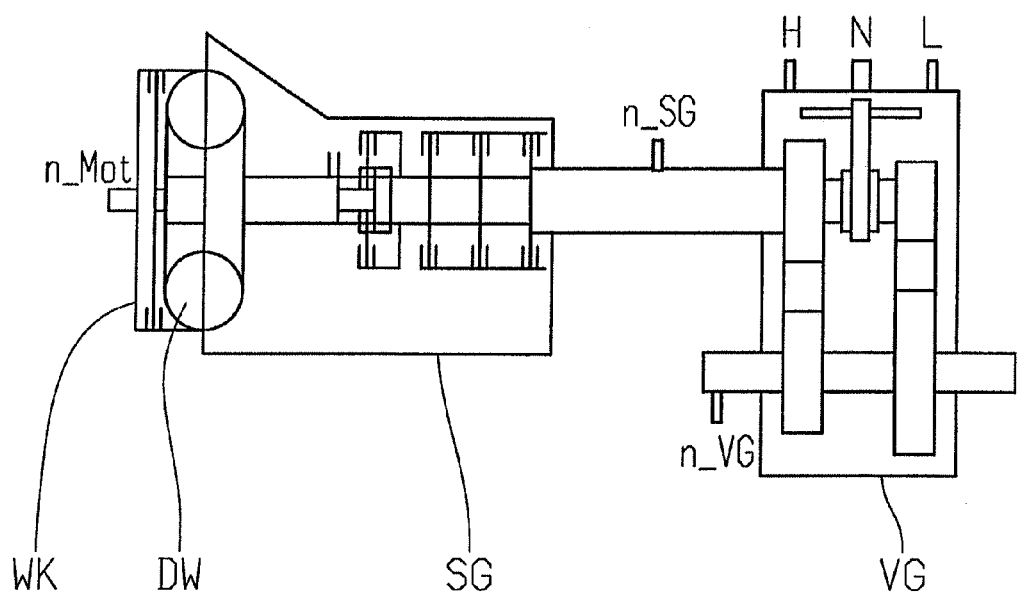
FIG. 1 a schematic presentation of a drive train of a vehicle to which the inventive method can be applied.

Illustrated in FIG. 1 is an example of a drive train of a vehicle that comprises a not shown drive engine which supplies engine rotational speed n_Mot to a torque converter DW having a torque converter lockup clutch WK. The torque converter DW is coupled with the input of a powershift automatic shift transmission SG. The output of the shift transmission SG is coupled with the input of a claw shift transfer gearbox VG. The transfer gearbox VG can be shifted via the shift claw from a neutral position N into a speed increase stage H (high) or a speed reduction stage L (low), so as to either increase or decrease the output rotational speed n_VG of the transfer gearbox VG. The illustrated drive train is just an example because the inventive method can also be applied, maybe accordingly modified, in other drive trains.

The inventive method is exemplified, on the one hand, based on a traction upshift ZH 5-6, beginning from a fifth gear step to a sixth gear step of the drive train and, on the other hand, based on a thrust down shift SR 6-5, beginning from a sixth gear step to a fifth gear step of the drive train.

The traction upshift ZH 5-6 is explained in the following based on the diagrams in FIGS. 2a to 2f.

Figure 2:
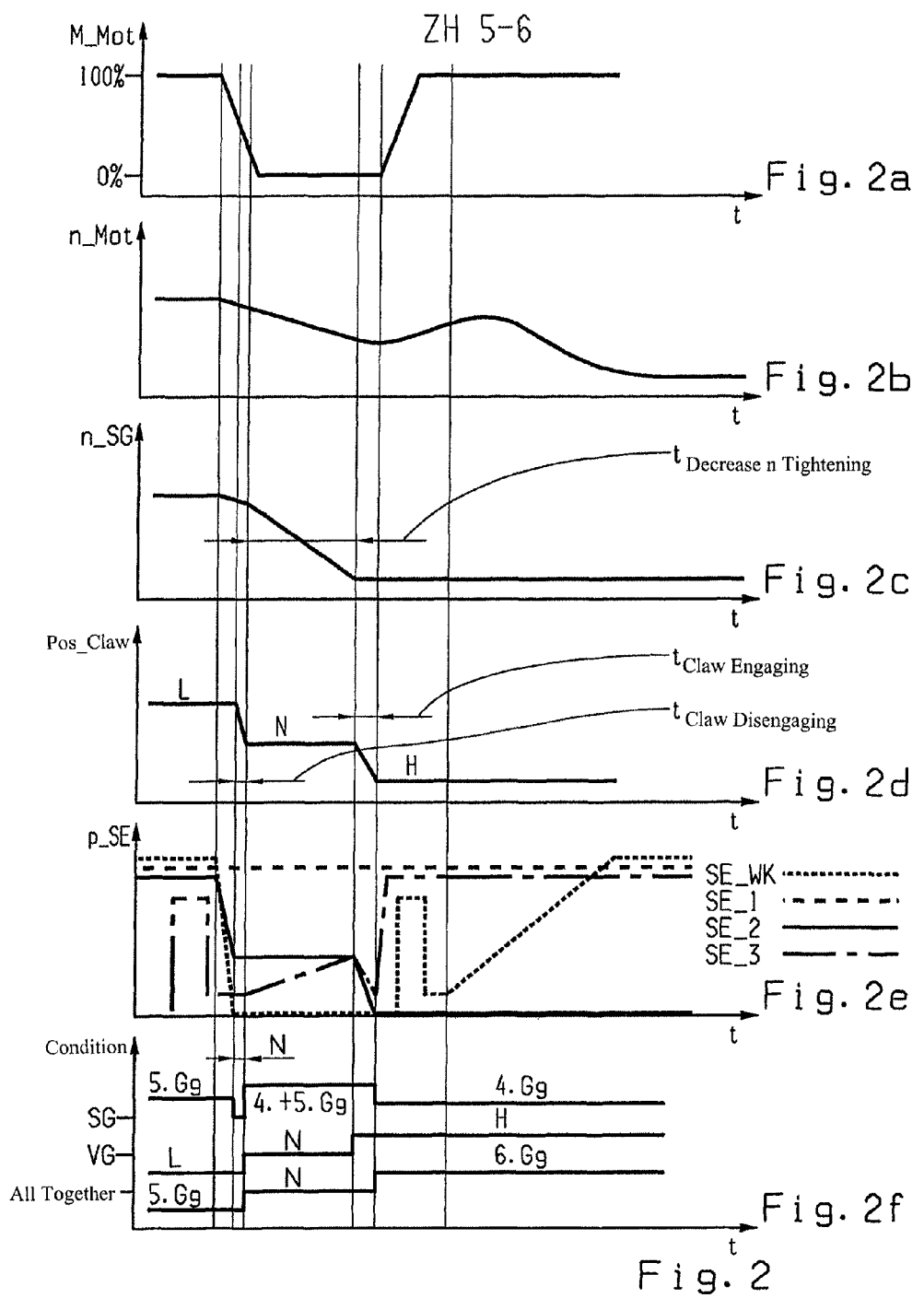
FIG. 2 comprising FIGS. 2a to 2f a traction up-shift from a fifth gear step in to a sixth gear step within the framework of the inventive method, illustrated based on different diagrams.

FIG. 2a shows the course of engine torque M_Mot which is supplied by the drive engine, FIG. 2b shows the course of engine rotational speed n_Mot, FIG. 2c shows the course of output rotational speed n_SG, FIG. 2d the course of the respective shift position N, L, H of the shift claw of the transfer gearbox VG, FIG. 2e shows the courses of respective activating pressure DE_1, SE_2, SE_3, SE_WK of the shift elements and of the torque converter lockup clutch WK, and FIG. 2f shows the courses of respective shift conditions of the shift transmission SG, of the transfer gearbox VG, and the overall results at the drive train over the time during the traction upshift.

In particular, it can be seen in accordance with FIG. 2e that pressure has to be applied always to two shift elements for the shifting of a gear, wherein, in preparation for activating a shift element, initially an almost rectangular pattern of the activation pressure is provided. In this example and during the traction upshift, the first shift element and the second shift element are assigned to the fifth gear of the shift transmission SG, and the first shift element and the third shift element are assigned to the fourth gear of the shift transmission SG. During the inventive synchronization, in addition to the first shift element, the second and the third shift elements are also activated, which is illustrated by the respective courses of the activating pressures SE_1, SE_2, and SE_3, so that there is a momentary interconnection of the shift transmission SG.

At the beginning of the traction upshift, the engine torque M_Mot is reduced for the disengagement of the torque converter lockup clutch WK. During that time, the shift claw is shifted from the speed reduction stage L into the neutral position N which can be seen, in particular, in FIG. 2d (t_Klaue_loesen). The time needed here is approximately 0.1-0.2 sec.

To disengage the torque converter lockup clutch WK, the activating pressure SE_WK of the torque converter lockup clutch WK is reduced to a minimum, as seen in FIG. 2e. Therefore, the drive engine is decoupled from the following drive train, namely the shift transmission SG and the transfer gearbox VG. In this condition, the shift transmission SG is temporarily shifted to the neutral position N, which can be seen in particular in FIG. 2f.

During the disengagement of the torque converter lockup clutch WK, the activating pressure SE_2 of the second shift element, which is assigned to the fifth gear in the shift transmission SG, is reduce to a predetermined value. At the same time, the activating pressure SE_3 of an additional third shift element, which is assigned to the fourth gear of the shift transmission, is increased so as to interconnect the shift transmission SG and to decrease the output rotational speed n_SG of the shift transmission SG, which can be seen in particular in FIG. 2c (t_Abbau_n_Verspann). The time needed here is approximately 0.2-0.4 sec.

During this time, the output rotational speed n_SG of the shift transmission SG is continually multiplied by the value of the output rotational speed n_VG and compared to the target transmission ratio i_VG of the transfer gearbox VG. As soon as the synchronous rotational speed is reached, the activating pressures SE_2 and SE_3 of the second and third shift elements are reduced to a minimum and the transfer gearbox VG or the shift claw, respectively, is shifted from the neutral position N into the speed increasing stage H, which can be seen in FIG. 2d (t_Klaue_einfahren). The total time needed here is just approximately 0.1-0.2 sec.

If the shifted speed increasing stage H is recognized in the transfer gearbox VG, the engine torque M_Mot can again be a transmitted and the activating pressure SE_3 of the required shift element, depending on the engine torque M_Mot, can be increased so that the total traction force is again available. Thereafter, the activating pressure SE_WK of the torque converter lockup clutch WK is again increased for engagement. Therefore, the inventive method can significantly reduce the traction force interrupt during the shifting of the transfer gearbox VG to less than 1 sec.

As can be seen in particular in FIG. 2f, the shift transmission SG is in the fifth gear before the shifting of the transfer gearbox VG, during the synchronization and for the deceleration or equilization, respectively, of the output rotational speed n_SG, the fourth and the fifth gear of the shift transmission SG become synchronized and after the shifting of the transfer gearbox, the fifth gear of the shift transmission SG is shifted. The transfer gearbox VG is, prior to the shifting, in the speed reductions stage L and, after the shifting, in the speed increasing stage H, so that the drive train has altogether prior to the shifting of the transfer gearbox VG a fifth gear step, and after the shifting of the transfer gearbox VG a sixth gear step is obtained.

Figure 3:
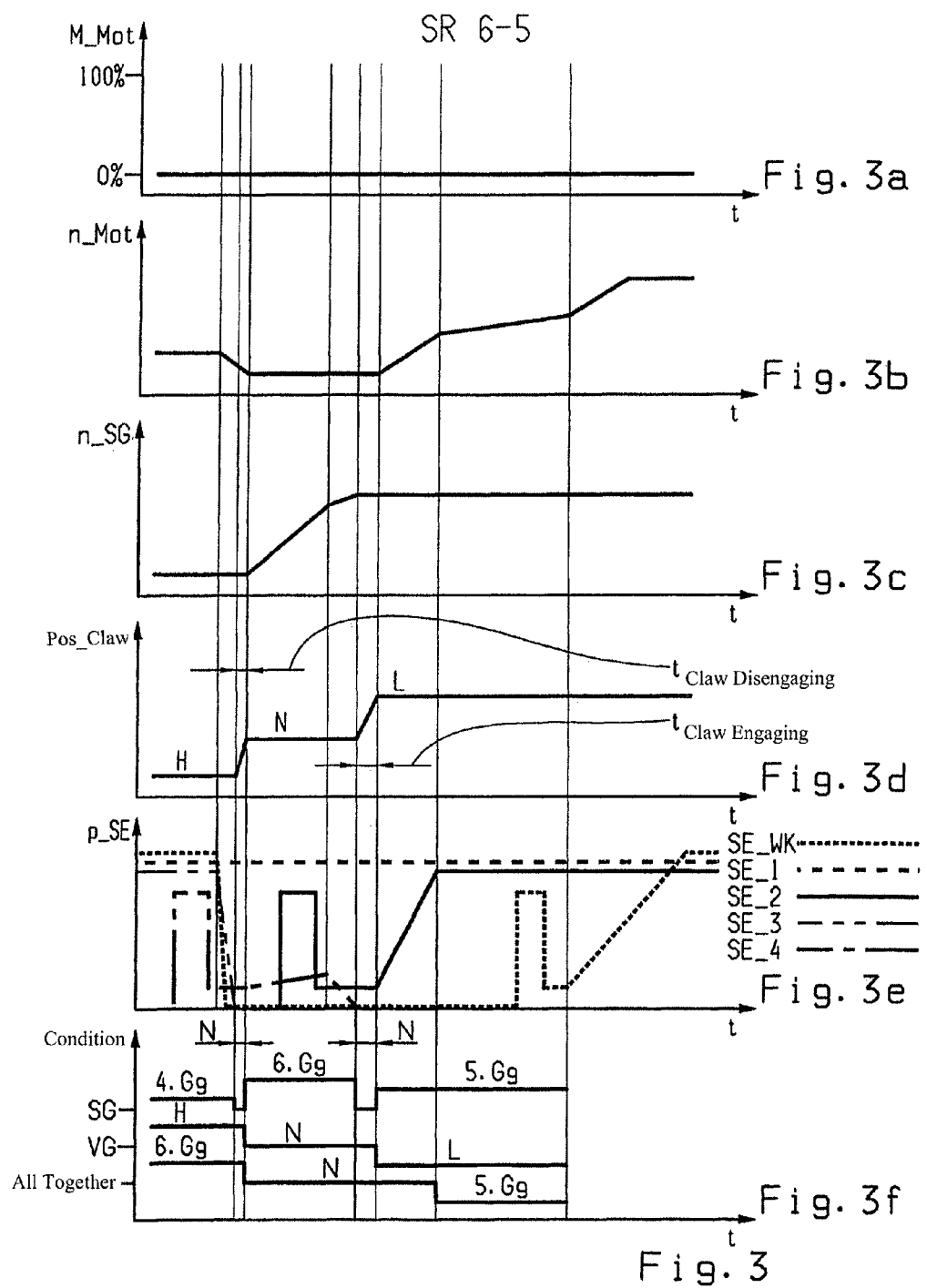
FIG. 3 comprising FIGS. 3a to 3f a thrust downshift from a sixth gear step in to a fifth gear step within the framework of the inventive method, illustrated based on different diagrams.

FIG. 3a shows the course of engine torque M_Mot which is supplied by the drive engine, FIG. 3b the course of engine rotational speed n_Mot, FIG. 3c the course of output rotational speed n_SG of the shift transmission, FIG. 3d the course of each shift position N, L, H of the shift claw in the transfer gearbox VG, FIG. 3e the courses of each activating pressure SE_1, SE_2, SE_3, SE_4, SE_WK of the shift elements and the torque converter lockup clutch WK, and FIG. 3f the courses of each shift condition of the shift transmission SG, of the transfer gearbox VG, and the resulting total drive train condition over the time during the thrust downshift.

The particular results of the activating pressure courses, in accordance with FIG. 3e, show that pressure need to be applied always to two shift elements to shift a gear, whereby prior to the activation preparation of a shift element an approximately rectangular course of the activating pressure is provided. During the thrust downshift in this example, the first shift element and the second shift element are assigned to the fifth gear of the shift transmission SG, and the first shift element and the third shift element are assigned to the fourth gear of the shift transmission SG, and the first shift element and the fourth shift element are assigned to the sixth gear. During the synchronization, in accordance with the invention, in addition to the first shift element, the second and fourth shift elements are also activated, which is presented in the respective courses of the activation pressures SE_1, SE_2, and SE_4, so that there is a brief acceleration of the output of the shift transmission SG.

At the beginning of the thrust downshift, the activating pressure SE_WK of the torque converter lockup clutch, as seen in FIG. 3e, is reduce to a minimum for the disengagement of the torque converter lockup clutch. Simultaneously, the activating pressure SE_3 of the third shift element, which is assigned to the fourth gear of the shift transmission SG, is reduced to a minimum. When the shift transmission SG is briefly shifted to the neutral position N, the shift claw of the transfer gearbox VG is shifted from the speed increasing stage H to the neutral position N, which is in particular seen in FIG. 3d (t_Klaue_loesen).

After the transfer gearbox VG is in the neutral position N, the activated pressure SE_4 of the fourth shift element, which is assigned to the sixth gear of the shift transmission, is increased so as to also increase the output rotational speed n_SG of the shift transmission. During that time, the shift element is prepared which is assigned to the fifth gear. As soon as the synchronous rotational speed of the shift claw of the transfer gearbox is reached, the shift claw of the transfer gearbox VG can be shifted from the neutral position N to the speed reduction stage L or engaged, respectively, which can be seen in FIG. 3d (t_Klaue_einfahren). As soon as the transfer gearbox VG is shifted into the speed reduction stage L, the activating pressure SE_2 of the second shift element, which is assigned to the fifth gear of the shift transmission SG, is continuously increased so that the drive train becomes engaged. Thereafter, the activating pressure SE_WK of the torque converter lockup clutch WK is also increased for its engagement.

As it can be seen in particular in FIG. 3f, the shift transmission SG is, prior to the shifting of the transfer gearbox VG, in the fourth gear. During synchronization, the sixth gear becomes synchronized for the acceleration or equilization of the output rotational speed n_SG. After shifting of the transfer gearbox VG, the fifth gear of the shift transmission SG is shifted. Prior to the shifting, the transfer gearbox VG is in the speed increasing stage H and after the shifting is in the speed reduction stage L so that the drive train has altogether a sixth gear step prior to the shifting of the transfer gearbox VG, and after the shifting of the transfer gearbox VG, a fifth gear step is obtained.

REFERENCE CHARACTERS

WK Torque Converter Lockup Clutch
DW Torque Converter
SG Shift Transmission
VG Transfer Gearbox
n_Mot Engine Rotational speed
M_Mot Engine Torque
n_SG Output Rotational speed of the Shift Transmission
n_VG Output Rotational speed of the Transfer Gearbox
i_VG Target Gear Ratio in the Transfer Gearbox
p_SE Activating Pressure
SE_WK Activating Pressure of the Torque Converter Lockup Clutch
SE_1 Activating Pressure of the First Shift Element
SE_2 Activating Pressure of the Second Shift Element
SE_3 Activating Pressure of the Third Shift Element
SE_4 Activating Pressure of the Fourth Shift Element
L Speed Reduction Stage low
H Speed Increasing Stage high
N Neutral Position
Pos_Klaue Shift Claw Position

The invention claimed is:

1. A method of shifting at least one of a speed increasing stage (H) and a speed reduction stage (L) in a claw shifted transfer gearbox (VG) in a drive train of a vehicle comprising a drive engine and a power shiftable shift transmission (SG), the transfer gearbox (VG) being shifted into a neutral position (N) and, after synchronization, either the speed increasing stage (H) or the speed decrease stage (L) is shifted in the transfer gearbox (VG), the shift transmission (SG), during synchronization, is either interconnected or accelerated by activating an additional shift element such that an output rotational speed (n_SG) of the shift transmission (SG) is equalized with an output rotational speed (n_VG) of the transfer gearbox (VG), multiplied by a target gear ratio in the transfer gearbox (i_VG), and during a traction upshift, the transfer gearbox (VG) is shifted from the speed reduction stage (L) into the neutral position (N), the method comprising the steps of:

thereafter activating a shift element of a lower gear of the shift transmission (SG) such that the output rotational speed (n_SG) of the shift transmission (SG) is reduced until the output rotational speed (n_SG) of the shift transmission and the output rotational speed (n_VG) of the transfer gearbox (VG) are synchronized, shifting the transfer gearbox (VG) from the neutral position (N) into the speed increasing stage (H), realizing the upshift without an engine deceleration intervention, and during a traction upshift in the drive train from a fifth gear into a sixth gear and after the neutral shifting of the transfer gearbox (VG), reducing an activating pressure (SE$_{-2}$) of the shift element, which is assigned to the fifth gear, to a predetermined value, while increasing an activating pressure (SE$_{-3}$) of the shift element which is assigned to the fourth gear.

2. The method according to claim 1, further comprising the step of, during the reduction of the activating pressure (SE$_{-2}$) of the shift element of the fifth gear and the increasing of the activating pressure (SE$_{-3}$) of the shift element of the fourth gear, continuously comparing the output rotational speed (n_SG) of the shift transmission (SG) with the output transmission speed (n_VG) of the transfer gearbox (VG), multiplied with the target gear ratio in the transfer gearbox (i_VG), until a rotational speed equality exists and the activating pressure (SE$_{-2}$, SE$_{-3}$) of both the shift elements of the fifth and the fourth gear is reduced and the speed increasing stage (H) of the transfer gearbox (VG) is shifted, and thereafter increasing the activating pressure (SE$_{-3}$) of the shift element of the fourth gear.

3. A method for shifting at least one of a speed increasing stage (H) and a speed reduction stage (L) in a claw shifted transfer gearbox (VG) in a drive train of a vehicle comprising a drive engine and a power shiftable shift transmission (SG), the transfer gearbox (VG) is shifted into a neutral position (N) and, after synchronization, either the speed increasing stage (H) or the speed reduction stage (L) is shifted in the transfer gearbox (VG), the shift transmission (SG), during synchronization, is either interconnected or accelerated by activating an additional shift element such that an output rotational speed (n_SG) of the shift transmission (SG) is equalized with an output rotational speed (n_VG) of the transfer gearbox (VG), multiplied by a target gear ratio in the transfer gearbox (i_VG), and during a thrust downshift, the transfer gearbox (VG) is shifted from the speed increasing stage (H) into the neutral position (N), the method comprising the steps of:

thereafter activating a shift element of a higher gear of the shift transmission (SG) such that the output rotational speed (n_SG) of the shift transmission (SG) is increased until the output rotational speed (n_SG) of the shift transmission is synchronized with the output rotational speed (n_VG) of the transfer gearbox (VG) multiplied with a target gear ratio in the transfer gearbox (i_VG), shifting the transfer gearbox (VG) from the neutral position (N) into the speed reduction stage (L), realizing the downshift without a rotational speed pre-definition in the drive engine, and during a thrust downshift in the drive train from a sixth gear into a fifth gear during the neutral shifting of the transfer gearbox (VG), reducing an activating pressure (SE$_{-3}$) of the shift element of the fourth gear, to a minimum value, and increasing an activating pressure (SE$_{-4}$) of the shift element of the sixth gear after the neutral shifting of the transfer gearbox (VG).

4. The method according to claim 3, further comprising the step of, during the reduction of the activating pressure (SE$_{-3}$) of the shift element of the fourth gear and the increase of the activating pressure (SE$_{-4}$) of the shift element of the sixth gear, continuously comparing the output rotational speed (n_SG) of the shift transmission (SG) with the output rotational speed (n_VG) of the transfer gearbox (SG) multiplied by the target gear ratio in the transfer gearbox (i_VG), until a rotational speed equality exists and the activating pressure (SE$_{-4}$) of the shift element of the sixth gear is reduced to a minimum and the transfer gearbox (VG) is shifted from the neutral position (N) into the speed reduction stage (L), and thereafter increasing the activating pressure (SE$_{-2}$) of the shift element of the fifth gear.

5. The method according to claim 1, further comprising step of, for de-coupling the drive engine during synchronization by reducing the activating pressure (SE_WK) of a torque converter lockup clutch (WK) of a torque converter (DW) prior to the neutral shifting of the transfer gearbox (VG) for the disengagement of the torque converter lockup clutch (WK) and increasing the activating pressure (SE_WK) of the torque converter lockup clutch (WK), after either the shifting of the speed increasing stage (L) or the speed reduction stage (L), to engage the torque converter lockup clutch (WK).

6. A method of shifting at least one of a speed increasing stage (H) and at least a speed reduction stage (L) in a claw shifted transfer gearbox (VG) of a drive train of a vehicle, the drive train comprising a drive engine, a load shiftable shift transmission (SG), and the transfer gearbox (VG), the shift transmission (SG) having at least first and second shift elements, the first shift element corresponding to a first gear in the shift transmission and the second shift element corresponding to a second gear in the shift transmission that is lower than the first gear, the method comprising the steps of:

initiating a traction upshift in the drive train from an initial gear stage to a higher target gear stage, in the initial gear stage, engaging the first shift element, disengaging the second shift element and utilizing the speed reduction stage (L) of the transfer gearbox, and in the target gear stage, disengaging the first shift element, engaging the second shift element and utilizing the speed increasing stage (H) of the transfer gearbox;

reducing torque transmitted by the drive engine and disengaging a hydrodynamic torque converter lockup clutch (WK);

shifting the transfer gearbox (VG) from the speed reduction stage (L) into a neutral position (N);

reducing an actuating pressure (SE$_{-2}$) of the first shift element to a predetermined value while increasing an actuating pressure (SE$_{-3}$) of the second shift element so as to reduce an output rotational speed (n_SG) of the shift transmission (SG) and synchronize the output rotational speed (n_SG) of the shift transmission with an output rotational speed (n_VG) of the transfer gearbox (VG), multiplied by a gear ratio (i_VG) in the transfer gearbox;

upon synchronization, reducing the actuating pressure (SE$_{-2}$) of the first shift element to disengage the first gear and reducing the actuating pressure (SE$_{-3}$) of the second shift element to a minimum;

shifting the transfer gearbox (VG) from the neutral position (N) into the speed increasing stage (H); and increasing the actuating pressure (SE$_{-3}$) of the second shift element to engage the second gear in the shift transmission (SG), and engaging the hydrodynamic torque converter lockup clutch (WK) to complete the traction upshift in the drive train from the initial gear stage to the higher target gear stage.

* * * * *